US012765522B2

(12) United States Patent
Vorwerk et al.

(10) Patent No.: US 12,765,522 B2
(45) Date of Patent: Oct. 20, 2026

(54) METHOD AND CONTROL SYSTEM FOR CONTROLLING AN AGRICULTURAL INSTALLATION FOR SMALL LIVESTOCK FARMING AND/OR MEDIUM LIVESTOCK FARMING

(71) Applicant: BIG DUTCHMAN INTERNATIONAL GMBH, Vechta (DE)

(72) Inventors: Hendrik Vorwerk, Lohne (DE); Sören Christian Meyer, Wildeshausen (DE); Urs Hunziker, Meilen (CH)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 385 days.

(21) Appl. No.: 18/373,604

(22) Filed: Sep. 27, 2023

(65) Prior Publication Data

US 2024/0099273 A1 Mar. 28, 2024

(30) Foreign Application Priority Data

Sep. 28, 2022 (LU) ....................................... 502847

(51) Int. Cl.

| | |
|---|---|
| ***A01K 29/00*** | (2006.01) |
| ***A01K 1/00*** | (2006.01) |
| ***G05B 13/02*** | (2006.01) |

(52) U.S. Cl.

CPC .......... *A01K 29/005* (2013.01); *A01K 1/0047* (2013.01); *G05B 13/024* (2013.01); *G05B 13/027* (2013.01)

(58) Field of Classification Search

None

See application file for complete search history.

(56) References Cited

U.S. PATENT DOCUMENTS

| | | | |
|---|---|---|---|
| 2015/0245595 A1 | 9/2015 | Muller et al. | |
| 2019/0289826 A1 * | 9/2019 | Tippery ................ | G06N 20/20 |

(Continued)

FOREIGN PATENT DOCUMENTS

| | | |
|---|---|---|
| DE | 102012017966 | 3/2014 |

OTHER PUBLICATIONS

Papst Franz et al., "Exploring Co-dependency of IoT Data Quality and Model Robustness in Precision Cattle Farming," Proceedings of the 17th International Conference on Emerging Networking Experiments and Technologies, ACMPUB27, New York NY (Nov. 15, 2021).

(Continued)

*Primary Examiner* — George Chen

(74) *Attorney, Agent, or Firm* — PRICE HENEVELD LLP

(57) ABSTRACT

A method for controlling an agricultural installation for small and medium livestock farming includes the steps of: acquiring at least one sensor signal of a sensor device of the agricultural installation configured for measuring a process or state variable in the agricultural installation; acquiring a plurality of further sensor signals from locally in the agricultural installation or from sensor devices distributed locally in another agricultural installation, wherein the distributed sensor devices are configured to measure process or state variables; storing the acquired sensor signals as cloud data in a cloud computing device; evaluating the sensor signal with an evaluation module, wherein the evaluation module is part of a control device of the agricultural installation and/or of a cloud computing device and wherein the evaluation takes at least a portion of the stored cloud data into consideration in order to verify the sensor signal in relation to the stored cloud data.

28 Claims, 4 Drawing Sheets

10

(56) References Cited

U.S. PATENT DOCUMENTS

| | | | | |
|---|---|---|---|---|
| 2020/0359550 | A1* | 11/2020 | Tran | G06Q 30/0206 |
| 2021/0081835 | A1* | 3/2021 | Kuper | H04W 4/029 |
| 2022/0124157 | A1* | 4/2022 | Binder | H04L 67/12 |
| 2023/0306795 | A1* | 9/2023 | Lechner | G07C 5/008 |

OTHER PUBLICATIONS

Schodl K et al., "Challenges of integration and validation of farm and sensor data for dairy herd management," ICAR 2022 (Jun. 2, 2022).

Kok A, et al., "Technical note: Validation of sensor-recorded lying bouts in lactating diary cows using a 2-sensor approach," Journal of Dairy Science (Nov. 1, 2015).

Lee Junghoon et al., "Intelligent Ubiquitous Sensor Network for Agricultural and Livestock Farms," Oct. 2011, Sat 2015 18th International Conference, Austin TX (2015-09-24-27).

Jensen Dan Borge et al., "Automatic counting and positioning of slaughter pigs within the pen using a convolutional neural network and video images," Computers and Electronics in Agriculture, Elsevier, Amsterdam (Jul. 17, 2021).

Yaseer Ahmed et al., "A Review of Sensors and Machine Learning in Animal Farming," 2021 IEEE 11th Annual International Conference on Cyber Technology in Automation, Control, and Intelligent Systems (CYBER) (Jul. 27, 2021).

* cited by examiner

METHOD AND CONTROL SYSTEM FOR CONTROLLING AN AGRICULTURAL INSTALLATION FOR SMALL LIVESTOCK FARMING AND/OR MEDIUM LIVESTOCK FARMING

CROSS-REFERENCE TO FOREIGN PRIORITY APPLICATION

The present application claims the benefit under 35 U.S.C. §§ 119(b), 119(e), 120, and/or 365(c) and which claims priority to Application No. LU502847 filed Sep. 28, 2022.

FIELD OF THE INVENTION

The present invention relates to a method for controlling an agricultural installation for small livestock farming and/or medium livestock farming. In addition, the present invention relates to a control system for controlling an agricultural installation for small livestock farming and/or medium livestock farming. In addition, the present invention relates to a computer program product, a computer-readable storage medium, a computer-readable data carrier, and a data carrier signal.

BACKGROUND OF THE INVENTION

Barn control systems for controlling an agricultural installation for small livestock farming and/or medium livestock farming are generally known and are in operation. Agricultural installations for small livestock farming and/or medium livestock farming are distinguished from agricultural installations for large livestock farming in the management overheads and requirements, because in large livestock farming, fewer large livestock animals are farmed and the large livestock animals have a more robust physique. In contrast, small and medium livestock animals are more vulnerable to fluctuations in processes.

Small livestock animals here include farm animals (livestock) such as rabbits and poultry, for example chickens, turkeys, or geese, which serve for the agricultural production of products such as eggs or as animals for slaughter. Medium livestock animals include farm animals (livestock) such as pigs (domestic pigs), goats, or sheep, which serve for the agricultural production of products such as milk, wool, or as animals for slaughter. Cattle and horses, which are classified as large livestock animals, are distinguished from small and medium livestock animals. The term “small and/or medium livestock animals” should therefore be understood to mean farm animals which have a live weight of less than 150 kg on slaughter. Pigs and farm poultry in particular are classified as such.

In this regard, during fattening and rearing of small and medium livestock animals, efforts are made to increase efficiency, whereby the resources used are conserved and the wellbeing of the animal is increased. Because of ever-tighter margins internationally with ever-increasing awareness (and therefore consideration for) the wellbeing of the animal, advances are concerned with fractions of a percentage point when seeking better results. Of particular significance in the small and medium livestock domain is that with small and medium livestock, even small perturbations in the set operational state lead to a reduced yield, because the small and medium livestock animals react sensitively to changes in process or environmental conditions. As an example, the egg laying rate in chickens drops significantly as a function of temperature or as a function of the diurnal rhythm, which is controlled with artificial lighting. In addition, the operational state has to be able to react dynamically to usual variations (other resource requirements which depend on the age of the animals) and also to unusual perturbations (drift of sensors, disease outbreaks, fluctuating environmental temperature (record summers), etc). This particular problem particularly affects livestock production situations with animals which have a weight gain per day and per animal of on average over 0.5% of the live weight at the point of slaughter, i.e., small and medium livestock animals.

These variable factors have a reducing effect on the overall efficiency of the livestock production installation in the long term, because if the reaction to a perturbation is too late, then the variation cannot be corrected (for example, a herd of animals might have eaten too little for one day and therefore will not reach the desired daily weight gain). Automated or manual regulating adjustments for efficient management of the agricultural installation are also indicative of a reduced overall efficiency, because each adjustment is based on a perturbation which implies a reduced efficiency in the time between the deviation from one nominal variable to regaining the nominal state (adjustment time for a control system). In addition, breaks for cleaning lead to a loss of yield, because when technology is dirty, some of the controllers of the installation are switched off and the livestock production installation is suboptimal for that period. In addition, incorrectly detected perturbations, i.e., incorrectly interpreting the state of the installation as being a perturbation situation, in the context of false alarms, result in the barn control system being adjusted too far from the ideal operational state.

In precision farming, sensor data which have an impact on an increasing number of actuators are collected. The manipulated variables for the actuators resulting therefrom are anything but clear because of the sensor data. An additional complication is the problem with small and/or medium livestock that with lower weights, surface area effects predominate over the interior effects of the animals. For livestock production, this means that with animals below 150 kg, the interaction with the barn climate occurs significantly faster and in a more sensitive manner than with larger animals, because the heat storage capacity of small and medium livestock animals is very much lower than with larger animals. This means that the extended barn climate is of particular importance with small and/or medium livestock when a maximum weight gain per kg of feed is to be obtained while taking the wellbeing of the animal into consideration.

Thus, the objective of the present invention is to address one of the aforementioned problems, to improve the general prior art or to provide an alternative to previous practice. In particular, a solution should be provided with which the overall efficiency (production) of an agricultural installation for small livestock farming and/or medium livestock farming can be increased. In particular, in addition, a solution should be provided with which the agricultural installation for small livestock farming and/or medium livestock farming is more robust as regards perturbations and process fluctuations in the fattening and rearing of the small and medium livestock animals can be reduced.

SUMMARY OF THE INVENTION

In accordance with the invention, the objective(s) is(are) achieved by means of a method in accordance with the disclosure set forth below.

Accordingly, a method for controlling an agricultural installation for small livestock farming and/or medium livestock farming is proposed. Thus, a control method is proposed which, for example, can be carried out with a control system such as a barn control system or the like. An example of an agricultural installation is a fattening farm, i.e., a technical installation in the animal production, animal husbandry, or livestock farming domain, in which agricultural farm animals are farmed for the production of foodstuffs and raw materials. In a particularly preferred embodiment, the agricultural installation is an installation for chicken farming and/or pig farming or for chicken fattening and/or pig fattening, in particular in order to produce eggs and/or slaughtered goods. In this regard, the "method for control" should be understood to mean both a closed-loop control and also an open-loop control in a control engineering context. In open-loop control in a control engineering context, a machine or installation is influenced with the aid of a manipulated variable, in particular without the control variable reacting to the manipulated variable. Closed-loop control is a process in which the actual value of a variable is measured and aligned with the nominal value by adjustment. In the present context, therefore, "control" can be construed generically in the context of a variation in the state of the agricultural installation with technical means or interventions.

The method comprises the steps described as follows: acquiring at least one first sensor signal of a first sensor device of the agricultural installation, wherein the first sensor device is configured for measuring a process variable and/or state variable in the agricultural installation.

A sensor signal can also be understood to mean a measurement signal and the sensor device as a measuring device. The sensor signal may be an analogue signal, a digital signal, or a data signal which comprises measured variables. The agricultural installation is therefore monitored sensorially with at least one sensor device which also may be understood to mean sensors. A sensor should be understood to be a subsystem in the context of animal production, which delivers an electronic measured value. This measured value may also be a complex signal (for example an analogue or digital signal) which is processed at a location which differs from where the measured value was recorded. A sensor value may also comprise simply switching an operating switch. The wording "at least" emphasizes that at least one sensor device is provided, but a plurality of sensor signals may be acquired. Process variables and state variables are known in principle. Process variables are variables which characterize a procedure or a process, in particular processes or procedures which are carried out in the agricultural installation. An example of a process variable is, for example, heat generated in a part of the agricultural installation which is generated in a combustion process or a power consumption or the like. Thus, process variables describe changes in states. State variables are variables which characterize a state, in particular states of the agricultural installation. An example of a state variable is a measured temperature in the agricultural installation, a measured light intensity, a humidity value, or the like. In addition, an image which is acquired with a camera system should be understood to be a state variable, because the camera image characterizes a current visual or optical state of the installation. The term "acquire" should be construed generically and is, for example, a measurement, a calculation, a recording or a collection of measurement data or the like. A first sensor signal may therefore, for example, be a temperature signal from a temperature sensor, a humidity signal from a humidity sensor, or even an image signal from a camera system, or the like.

In addition, the method comprises the step of: acquiring a plurality of further sensor signals from locally in the agricultural installation and/or from sensor devices distributed locally in another agricultural installation, wherein the distributed sensor devices are configured to measure process variables and/or state variables in the agricultural installation.

It is therefore proposed that a plurality of sensors are monitored in the agricultural installation in which the control method is deployed. In addition or as an alternative, it is proposed to measure sensor signals locally in another agricultural installation, i.e., in an installation at which the control method is not directly deployed. The discussions above relating to the sensor signals, sensor devices, process variables, state variables, and for acquisition apply mutatis mutandis. It should be understood that the further sensor signals are or may be sensor signals which are other than the first sensor signal, wherein this means that the sensors are different. The plurality of the further sensors serve as a basis for comparison in order to verify the first sensor signal in a later step, i.e., for checking accuracy. The further sensor signals are continuously acquired and stored or at least acquired and stored in repetitive cycles. In addition to the variation of monitoring the agricultural installation to be controlled with a plurality of sensors, it is also proposed to use sensor signals from another agricultural installation as reference variables for the verification of the first sensor signal. Accordingly, the further sensor signals may also originate from locally distributed sensors of another agricultural installation.

In addition, the method comprises the step of: storing the acquired sensor signals as cloud data in a cloud computing device.

It is therefore proposed to store the first sensor signal and/or the further sensor signals as cloud data in a cloud computing device. Thus, the further sensor signals or optionally in addition, the first sensor signal, may be stored as cloud data. The term "cloud data" should be understood to mean data which is stored externally in cloud storage. Thus, cloud data are pieces of information which are stored outside the agricultural installation and can be called up via a communication interface. As an example, the cloud storage may be a cloud storage system with a cloud database, or may be understood to mean a cloud database system. Thus, the cloud data are provided for cloud computing or for the construction of a cloud database. The term "cloud computing" describes the provision of computing services, including servers, storage, databases, networks, software, analyses, and intelligence which are implemented in or executed on an external installation. An example of cloud computing is a software application which is implemented on a cloud computer or server and which accesses a cloud database via a data interface in respect of a request and which delivers cloud data from the cloud database as the response to the request, and the cloud data which is received is processed in the software application.

Collecting data from all of the sensors enables the relevant measurement parameters, for example type of barn construction, location of sensor mounting, sensor type, animal occupancy, etc, to be taken into consideration and the generation of a compensating offset which may, for example, be used to balance out a discrepancy in a sensor signal. In this regard, on the one hand it becomes possible to reduce the inaccuracy in the measured value for the first sensor device, and on the other hand it becomes possible to determine a qualitative prediction of the reliability of the first sensor device with the aid of the cloud data. Thus, the cloud data can be taken into co-consideration in a controller during decision-making.

It is preferably proposed that in the cloud computing device, additional data may also be stored which was not acquired by a sensor device. Examples are the additional data of barn data, position data for sensors, animal data, feed data, profile data, or the like.

In addition, the method comprises the step of: evaluating the first sensor signal with an evaluation module, wherein the evaluation module is part of a control device of the agricultural installation and wherein the evaluation comprises taking at least a portion of the stored cloud data into consideration, in order to verify the first sensor signal in relation to the stored cloud data.

It is therefore proposed to verify the first sensor signal with the aid of the stored cloud data, i.e., to verify the first sensor signal with the aid of the measurement data from the further sensor signals of the distributed sensor devices which are stored as cloud data. The evaluation of the first sensor signal is carried out here with an evaluation module. The evaluation module is, for example, a software module and/or a hardware module. The evaluation module is implemented in a control device of the agricultural installation. In this regard, the control device may also be understood to be the installation control system and, for example, be configured with a process computer or the like. The evaluation module is configured to receive the first sensor signal, i.e., from the first sensor device, and then to verify this sensor signal in relation to the stored cloud data. Here, “verification” means establishing correctness. Verification may also be understood to mean inspection, evaluation, testing, or assessing. It is therefore proposed to inspect or assess the correctness of the first sensor signal with the aid of the stored cloud data using the evaluation module. To this end, evaluation rules may be implemented in the evaluation module or an algorithm may be implemented in the evaluation module which is configured to test the first sensor signal in relation to the stored cloud data.

In addition or as an alternative, it is proposed that the evaluation module is part of a cloud computing device, i.e., the evaluation module is implemented on an external calculation unit such as a cloud server or the like.

It should be understood that the control device is configured to receive the cloud data via an interface. To this end, the control device may, for example, make a request to a cloud database via the interface and then the requested cloud data element is returned as the response to the request. If the evaluation module is part of a cloud computing device, the cloud computing device is also configured via an interface to receive the cloud data, for example as described above with respect to the control device, via a request and a data interface.

It has been recognised that individual measurement signals may be individually faulty if, for example, a sensor is set incorrectly, or has a defect or a continuous deviation in a measurement. It is therefore proposed to verify the first sensor signal with the aid of the stored cloud data. By means of the automated verification with cloud data, incorrect control interventions or erroneous sensor signals can be prevented, whereupon the overall efficiency of the agricultural installation increases.

A control intervention is quite generally a modification of a state of the agricultural installation by controlling a regulator of the installation. The regulator may also be understood to be an actuator.

As an example, the first sensor signal may be a camera signal which is verified with stored temperature data or other image data from other cameras. In a specific example, a camera system as the first sensor device may optically and automatically detect by means of object recognition that the livestock is shivering. The cause of the shivering could be cold or anxiety if the livestock has heard a loud noise and is frightened, for example during bad weather. With the aid of the additional consideration of the stored data, the camera signal, i.e., the first sensor signal, can be verified with the cloud data, wherein temperature data from the installation are checked, for example. Thus, the evaluation module verifies the camera signal in relation to the stored temperature data and concludes from it that the shivering is from cold if the temperature is too low. Subsequently, a control intervention can be made and the temperature can be raised. In the case of shivering from anxiety, no control intervention needs to be carried out, or soothing acoustic signals may be generated.

In a second example, the first sensor signal is a temperature signal with a poor resolution, for example with a resolution of ±1° Celsius. Because of temperature-distorting flows of air in the barn, this imprecise resolution can additionally lead to the fact that the first sensor signal with the poor resolution could differ from the actual temperature value in the barn by up to 2-3° Celsius. As a rule, the temperature sensors are mounted in the ceiling, floor, or wall region, so that they could indicate a different temperature compared with the centre of the space. It is now proposed to verify the first sensor signal, i.e., the temperature signal, with the aid of fan data or with the aid of other temperature sensors. If, for example, the temperature sensor differs too much from a mean value for the other sensors, then it can be assumed that the sensor is defective.

The present invention therefore makes use of the realisation that, despite correct measurement results, sensor signals are not unambiguous or may be faulty and reference data or comparative data of any type can be used to test the sensor signals. Examples in this case are, as already mentioned, a camera system with automated object recognition which provides a false interpretation of the camera image, or an inaccurate or defective temperature sensor which issues an incorrect value.

In addition, it has been discovered that the first sensor signal, if it is incorrect, can be dynamically compensated for with the aid of the cloud data. As an example, a new value for the first sensor device may be determined from the first sensor signal and the cloud data. This also enhances the reliability and robustness of the barn control system.

A solution is provided by means of which incorrect control interventions because of incorrect sensor signal are prevented, in which sensor signals which at first view appear to be correct are verified with the aid of additional data which is stored in cloud storage.

The first sensor signal can therefore also be understood and described as an uncertain signal. Examples of such uncertain signals are, for example, camera signals and their interpretation for the animal behaviour, or sensor signals which have an undetected drift and originate, for example, from the group of sensors. As an example, one sensor from a sensor group could have a greater deviation from a mean value and this drift is only noticed by the verification of the temperature sensor with the aid of the cloud data which comprises data from other temperature sensors. A further example of an uncertain signal is also a failed sensor signal. As an example, one sensor might fail completely, and normally, an intervention is made by the barn control system because of the sensor failure. The failed sensor signal might, however, be verified on the basis of the cloud data and it might be established that the sensor has in fact failed, but because of the other sensor data, there is no need for a control intervention. Thus, with the aid of alternative sensors which, for example, do not belong to the same class of sensors, a substitute value can be determined or calculated which is used for essential control. In addition, contradicting sensor signals may also be understood to be uncertain signals. As an example, it may occur that the control device establishes that the humidity is too high and therefore the rate of change of air in the installation is increased by controlling the fans. The installation operator could at the same time observe a drop in temperature and then manually switch off the fan which blows cold air. This brings about a control conflict. By verifying the first signal with the cloud data, this conflict can be resolved and a contradicting signal can be verified and prioritised. A further example of an uncertain sensor signal is that sensors have tolerances in accuracy. Within the inherent accuracy of a sensor, under certain circumstances, this may be sufficient for a correct control intervention. With the aid of the verification with the cloud data, however, other temperature sensors or other data may be taken into consideration in order to increase the accuracy. Thus, the control is more accurate and at the same time, the overall efficiency of the installation is increased. Thus, weak, uncertain, inaccurate, irregular or unreliable data, which describe an actual state of the agricultural installation, or variations, in particular first derivatives thereof, i.e., delta pro T, or trends, i.e., in particular future data projections, which can be understood to be an uncertainty because of the deep data quality, cannot be used directly as a trigger value for control. For a major proportion of the sensors used in a barn environment, there is a problem with perturbation signal overlay or drift or biassing, for example electrical biassing.

It has therefore been recognised that such uncertain sensor signals can be improved by external data from a specific cloud as regards their quality (significance). Because the values from many sensors are stored in a higher-level cloud system, these are directly available for local evaluation, preferably by means of retaining the data in question offline in a local system, and also directly in online mode, preferably under cloud computing mechanisms.

Thus, a closed control system is proposed which is orientated towards the wellbeing of the animal or the breeding targets for the small livestock farming and/or medium livestock and optimises small values in the control adaptation domain with the aid of cloud data.

It is therefore proposed that the first sensor signal, which may be an uncertain or faulty signal, is assessed by means of cloud data and its significance is determined. The evaluation may, for example, be carried out by means of algorithms such as cloud computing or big data evaluation or machine learning methods. Thus, the first sensor signal becomes improved, qualified, or quantified. Based on this, an automated action can be initiated, for example a control signal, a warning, or a suggestion.

Thus, the solution in accordance with the invention collects data from all sensors and therefore enables relevant measurement parameters such as the barn construction, sensor mounting site, sensor type, animal occupancy, etc, to be taken into consideration in generating a compensating offset which then compensates for the discrepancy in the measured value. Thus, an inaccuracy in the measured value of the sensor can be reduced and on the other hand, a qualitative prediction of the reliability of the sensor value can be determined. This can be taken into consideration in the decision-making of the controller.

Preferably, the first sensor signal is adjusted by a periodic and/or real time verification with the aid of the cloud data. In other words, a compensating offset is permanently calculated on the basis of the data in the cloud. Thus, a dynamic adaptive biassing is proposed. Thus, for example, a poorly resolved sensor device can be overwritten with a new value and the new value can then be taken into consideration in the closed-loop control.

Preferably, the method comprises the additional step of: generating one or more verified control signals in order to control at least one regulator of the agricultural installation, wherein the verified control signal is a control signal which is generated on the basis of the combined evaluation of the first sensor signal and the cloud data.

Thus, it is proposed that an automated intervention in the agricultural installation occurs with the control device, namely on the basis of the evaluation or testing of the first sensor signal in relation to the cloud data. A verified control signal is generated which may also be understood to be a control signal or control command. The control signal is provided to a regulator of the agricultural installation as a control signal. The control signal is verified, i.e., it is generated on the basis of the evaluation of the first sensor signal in relation to the cloud data. The verified control signal is preferably generated when the preceding evaluation has confirmed that the first sensor signal is a verified sensor signal, i.e., the sensor signal has been classified by the evaluation as being sufficiently correct or reliable. The regulator may also be considered to be an actuator. Examples of regulators are pumps, lamps, fans, motors, door openers, or the like.

More preferably, the control signals are part of a closed-loop control of the agricultural installation. It is therefore proposed to generate control signals as manipulated variables in a closed-loop control. Thus, the control device constitutes the controller in the control engineering context to which a nominal variable is provided and this nominal variable is compared with the acquired sensor signals and/or cloud data, representing the control feedback. The agricultural installation constitutes the control path.

More preferably, the control signals are prioritised and have priorities which can be configured differently. It is therefore proposed that a plurality of control signals are associated with a priority. This priority is preferably capable of configuration, i.e., can be adjusted. The priority serves to provide unambiguousness in the closed-loop control when a plurality of control signals are present at the same time. Thus, the control signal with the highest priority is executed.

Preferably, the method comprises the additional step of: generating one or more verified warning signals in order to indicate a warning and/or in order to indicate a perturbation of the agricultural installation, wherein the verified warning signal is a warning signal which is generated on the basis of the combined evaluation of the first sensor signal and the cloud data.

It is therefore proposed to issue an automated warning in the agricultural installation, namely on the basis of the evaluation or testing of the first sensor signal in relation to the cloud data. A verified warning signal is generated which may also be understood to be a warning or alarm. The warning signal is provided and configured in order to indicate a warning and/or to indicate a perturbation in the agricultural installation. The warning signal is provided, for example, to a warning means of the agricultural installation such as a siren, a warning indicator, or the like. The warning signal is verified, i.e., it is generated on the basis of the evaluation of the first sensor signal in relation to the cloud data. The verified warning signal is preferably generated when the preceding evaluation has concluded that the first sensor signal is not a verified sensor signal, i.e., the first sensor signal has been classified by the evaluation as being inaccurate or not reliable.

Preferably, the method comprises the additional step of: generating one or more verified suggestions for optimised operating parameters or operational settings of the agricultural installation, wherein the verified suggestion is a suggestion which is generated on the basis of the combined evaluation of the first sensor signal and the cloud data.

It is therefore proposed to generate an automated suggestion for optimised operating parameters or operational settings of the agricultural installation, namely on the basis of the evaluation or testing of the first sensor signal in relation to the cloud data. A verified suggestion is generated which can also be understood to be an automated expert suggestion, as is known from expert systems. The suggestion is indicated, for example, with or on a display device, for example on a computer terminal, on a terminal, or on any other display. The suggestion is verified, i.e., it is generated on the basis of the evaluation of the first sensor signal in relation to the cloud data. The verified suggestion is preferably generated when the preceding evaluation has concluded that the first sensor signal is not a verified sensor signal, i.e., the first sensor signal has been classified by the evaluation as being not sufficiently accurate or not reliable.

Preferably, in addition or as an alternative, the method comprises the step of: executing at least one action after detection of a discrepancy between the first sensor signal and the stored cloud data from the list of actions including: providing an extract of the first sensor signal and recorded cloud data; indicating a suggestion for modifying the operating parameters or for operational settings of the agricultural installation; and/or indicating a suggestion for a control of a regulator of the agricultural installation.

Thus, it is proposed to provide the first sensor signal and the recorded cloud data, for example displayed electronically on a terminal or in an analogue manner as a printout, for example in the form of a list. An installation operator can check the prepared data and assess the sensor signal and the cloud data manually and can carry out control interventions manually. In addition, a further action may be to display suggestions for modifying the operating parameters or operational settings of the agricultural installation, preferably on a terminal or directly on a control terminal of the agricultural installation. Thus, the installation operator can check the suggested parameters or settings and can accept or decline the suggestions. A further action is indicating a suggestion for controlling a regulator of the agricultural installation. Thus, for example, on the basis of the sensor signal and the cloud data, it may be suggested that a regulator be activated which the installation operator has not yet activated or that an overview of all of the data leads to an increased efficiency. An example is to display the suggestion for increasing the temperature as a precautionary measure when a temperature sensor in another agricultural installation has detected a drop in temperature.

In a particularly preferred embodiment, an actuation of said actions is executed in relation to a specific measurement of the detected discrepancy.

It is therefore proposed to determine the discrepancy between the first sensor signal and the cloud data quantitatively and to determine a value for the discrepancy by evaluation. The evaluation is preferably carried out with the evaluation module. The measurement of the discrepancy may be carried out here with the aid of sensor signals of the same type, or even with sensor signals of different types, or cloud data.

Preferably, before storage of the cloud data in the cloud computing device and/or the agricultural installation, at least one of the following steps is carried out: receiving the acquired sensor signals as raw data in a concentration module; processing the raw data with the concentration module and storing the processed raw data as cloud data.

Preferably, the processing of the raw data comprises anonymising the cloud data, compression, encoding and/or categorisation of the raw data.

It is therefore proposed to treat and concentrate the raw data by means of pre-processing. This means that the data are processed and no unnecessary data are stored. The process of evaluation of the cloud data can therefore be speeded up, whereupon the evaluation step is speeded up. In addition, large quantities of data are generated in agricultural installations for small livestock farming and/or medium livestock farming. Because of the limited storage capacities of the cloud data base, processing and concentration of the raw data means that more relevant information can be stored as cloud data. In this regard, more comparative data is available for verification of the first sensor signal and a more precise verification is provided. In the context of cloud storage, the cloud data are anonymised, so that a result is indeed stored, but cannot be traced back to the producer. This anonymisation can also be carried out first when a third party draws down the data. In this manner, individual data belonging to each farmer is protected from unwanted external access.

Preferably, the measured process variable and/or state variable of the first sensor device and/or the measured process variables and/or state variables of the distributed sensor devices is/are variables for characterizing a barn climate in the agricultural installation.

Preferably, the process variables and/or state variables are variables from the list including:

- a process variable and/or state variable for characterizing a harmful gas concentration (CO, $CO_2$, $H_2S$, $NH_3$),
- a process variable and/or state variable for characterizing a brightness (in particular its value during the diurnal cycle),
- a process variable and/or state variable for characterizing a composition of the light,
- a process variable and/or state variable for characterizing an amount of fresh air,
- a process variable and/or state variable for characterizing a movement of air,
- a process variable and/or state variable for characterizing a dust concentration,
- a process variable and/or state variable for characterizing a temperature, and
- a process variable and/or state variable for characterizing a humidity,
- a process variable and/or state variable for characterizing a level of noise.

More preferably, the variables for characterizing the barn climate are measured with at least one barn climate sensor.

In a particularly preferred embodiment, a barn climate sensor is a gas sensor, a light sensor, a flow sensor, a dust sensor, a temperature sensor, a humidity sensor, and/or a noise sensor.

Thus, it is proposed that the first sensor device and/or the other locally distributed sensor devices are sensors which characterize the barn climate in the agricultural installation. The sensors may be harmful gas sensors, brightness sensors, light composition sensors, flow sensors for determining a flow of fresh air and/or a movement of air, dust sensors, temperature sensors or humidity sensors, or the like. Sounds are also associated with the barn climate.

Preferably, the measured process variable and/or state variable of the first sensor device and/or the measured process variables and/or state variables of the distributed sensor devices are variables for characterizing a physiological and/or ethological mechanism of a behaviour of a farm animal in the agricultural installation.

Thus, it is proposed to monitor the physique and/or the behaviour of the small and medium livestock animal by data acquisition. Physiological mechanisms here refer to mechanisms in the small and/or medium livestock which concern the physique of the livestock, for example shivering or the like. Ethological mechanisms refer to mechanisms of the small and/or medium livestock which concern the behaviour of the livestock, i.e., grouping or piling, for example. The process variable and/or state variable for characterizing a physiological and/or ethological mechanism of a farm animal behaviour may also be understood to be synonymous with animal-related data. In this regard, animal-related data includes information regarding at least one specific or specifiable small and/or medium livestock animal. These data may be acquired sensorially by a measurement device or via data acquisition.

Preferably, the process variables and/or state variables for characterizing a physiological and/or ethological mechanism are variables from the list including:

- a process variable and/or state variables for characterizing wallowing of the farm animals,
- a process variable and/or state variables for characterizing piling of the farm animals,
- a process variable and/or state variables for characterizing seeking shade in the farm animals,
- a process variable and/or state variables for characterizing shivering of the farm animals from cold,
- a process variable and/or state variables for characterizing panting of the farm animals,
- a process variable and/or state variables for characterizing the food intake of the farm animals, and
- a process variable and/or state variables for quantifying an estimate of the weight of the farm animals.

More preferably, the variables for characterizing a physiological and/or ethological mechanism of a behaviour of the farm animal in the agricultural installation are measured with a camera system which is configured with an image recognition algorithm for detecting a physiological and/or ethological mechanism in the farm animal behaviour.

It is therefore proposed to use a camera system in the agricultural installation which is configured, by means of an image recognition algorithm, to detect a physiological and/or ethological mechanism and to express it as a measured value. The image recognition algorithm may also be considered to be object recognition or image recognition. The image recognition algorithm may, for example, be implemented as a software program in the camera system or in the control device of the agricultural installation or in the cloud computing device.

These physiological or ethological patterns are sometimes difficult to recognise in pigs and chickens. On the one hand, in the case of chickens, there are a very large number of animals in one area under similar conditions, and purely for statistical reasons can frequently give rise to misinterpretations. These misinterpretations can be reduced by appropriate comparisons with the cloud data. On the other hand, the intelligence or ability to learn of pigs leads to perturbations. By random stimuli and their reactions in the barn, pigs have (by chance) learned some unwanted interventions in the control mechanisms and can therefore influence the outcomes. Even these non-statistical rogue results could be reduced with cloud data and the control system and the control device can be brought into reliable operation.

In addition, in the case of chicken enclosures, the ingress of pigeons has been discovered; they imitate the movement behaviour of the chicken so that no reactions are triggered in the chickens, and so they can feed in peace. In just such situations, the additional comparison of the image data with cloud data is of use. Pigeons will therefore be recognised more readily and counter-measures can be introduced.

Particularly preferably, a movement profile of the individual farm animals is recorded and analysed in order to recognise the physiological and/or ethological mechanism in the farm animal behaviour.

It is therefore proposed to track the movement profile of the individual farm animals with the camera system. This means that a movement history of the small and/or medium livestock can be generated and this profile can be stored as cloud data. With the aid of the movement profile, it can be verified, for example, as to whether the chickens are agitated or calm or are gathered into groups, which could be a sign of an anxiety reaction.

Preferably, the method comprises the additional steps of: using a camera system as the first sensor device which is equipped with an image recognition algorithm for detecting a physiological and/or the ethological mechanism in the farm animal behaviour and using barn climate sensors as the distributed sensor devices for measuring variables for the characterization of a barn climate in the agricultural installation, and for evaluating the first sensor signal presented as a camera signal from the first sensor device with the evaluation module, wherein the evaluation comprises taking at least a portion of the stored cloud data into consideration in order to verify the physiological and/or the ethological mechanism in the farm animal behaviour measured with the camera system in relation to the variables stored as cloud data for the characterization of the barn climate in the agricultural installation.

It is therefore proposed to verify a camera image for monitoring the small and medium livestock animal with the aid of additional sensors. As an example, the first sensor signal may be a camera signal which is verified with stored temperature data or other image data from other cameras. In a specific example, with a camera system as the first sensor device, it can be optically detected that the animals are shivering. The cause for the shivering could be cold or anxiety if, for example, the animals have heard a loud noise and are frightened. With the aid of the additional consideration of the stored cloud data, the camera signal, i.e., the first sensor signal, can be verified with the cloud data which, for example, includes temperature data from the installation. The evaluation module then verifies the camera signal as a function of the stored temperature data and concludes that shivering from cold is present. Then, a control intervention may be made and the temperature may be raised. In the case of shivering from anxiety, no control intervention needs to be made, or soothing acoustic signals are generated in order to reduce the stress in the animals. Stress here has a negative effect on the productivity and growth of the animals.

It has been shown that with the improvement in the quality of the first sensor signal by means of cloud mechanisms, especially camera-based, in particular with one or more coupled cameras, automated interpretations of situations in the agricultural installation can be made. Until now, sensors, for example for the detection of physiological and/or ethological mechanisms of animal behaviour, have indeed detected such mechanisms, but the confidence of such an interpretation was until now too low in order to be able to initiate actions in the agricultural installation based on it. By incorporating additional context-related sensor values (same type of animal, similar barn construction, similar barn climate situation, similar outside climate/season, etc), automated actions, i.e., control interventions, become possible.

Preferably, the step of evaluation of the first sensor signal with an evaluation module comprises the additional step of: using a machine learning algorithm to evaluate the first sensor signal and the stored cloud data in order to verify the first sensor signal in relation to the stored cloud data with the machine evaluation algorithm.

A machine learning algorithm for evaluating the first sensor signal and the stored cloud data is therefore proposed. Many machine learning algorithms are known, such as artificial neural networks, for example. This algorithm is, for example, implemented in the evaluation module as a computer program. The learning algorithm inputs the first sensor signal and the cloud data as input data, executes the algorithm and then provides an indicator or value which characterizes the first sensor signal as verified. Artificial neural networks may also be described as artificial intelligence (AI) and describe artificial intelligence algorithms.

More preferably, the machine learning algorithm is a trained artificial neural network for verifying the first sensor signal and the stored cloud data, in order to verify the first sensor signal in relation to the stored cloud data with the trained neural network.

It is therefore proposed that the machine learning algorithm for evaluating the first sensor signal and the stored cloud data is an artificial neural network (ANN). The ANN is, for example, implemented in the evaluation module as a program or code. The ANN inputs the first sensor signal and the cloud data as input data, compares these input data with the trained features, and then outputs an indicator or value which characterizes the first sensor signal. An output value from the ANN could, for example, be a confidence value which is between 0% and 100%, or a value for a measure of the offset from the cloud data. It should be understood that the trained ANN will have been trained with labelled data sets, i.e., with known and already classified data sets. As an example, the ANN will have been trained with known image data in which the small livestock farming and/or medium livestock have shivered and with temperatures. Thus, for example, in the case of low temperatures and shivering of the animal, the ANN outputs that the shivering which has been detected is shivering from cold.

Particularly preferably, a cloud-based machine learning algorithm is used which is implemented in the cloud computing device. It is therefore proposed to implement the algorithm externally in the cloud computing device.

It has been shown that in the case of a large quantity of data, the large quantity of data are particularly suitable for being interpreted, improved, and/or accumulated by means of artificial intelligence. In this regard, preferably, in order to reduce a large amount of communication, data processing externally of the farm is proposed, in particular by cloud processing. Thus, it is proposed to carry out the data processing externally. In addition, evaluation results or received approval signals can be uploaded into the cloud and, for example, be used as learning matrices for the machine learning process. This enables even finer control of the target parameters and/or enables a search for anomalies without specific search directions. Thus, a precautionary control method is provided. In addition, this enables additional teaching matrices to be generated and supports machine evaluation algorithms for future similar cases. In particular, by means of this process, elements of reinforced learning can be used. In other words: the assessment by humans is used twice: on the one hand, a control action is initiated in the installation and on the other hand, an evaluation algorithm can learn further on the basis of the approval signal in order to improve future assessments.

Preferably, the method comprises the additional step of: providing a user interface for receiving decision signals and for consideration in the decision module, in particular after generating a verified warning signal and/or after generating a verified suggestion for optimised operating parameters.

Preferably, a verified control signal for controlling at least one regulator of the agricultural installation is generated on the basis of the decision signal.

Thus, it is proposed to receive decisions of the installation operator via a user interface, which may be considered to be an input interface. The decision signals or the decision signal may be considered to be a manual signal or approval. If, for example, a verified warning signal or a verified suggestion is indicated to the installation operator, then on the basis of the warning or the suggestion, they can initiate a control of a regulator of the agricultural installation by means of an approval. Thus, an additional and manual approval from the installation operator is proposed. In this manner, an additional level of safety is proposed, and interventions by controls in the agricultural installation are only triggered when the approval by the operator or manager is present. Thus, incorrect automated interventions in the agricultural installation can be reduced.

In addition or as an alternative, adjustment of a machine learning algorithm and/or of a big data algorithm and/or of a cloud computing algorithm is preferably carried out on the basis of the decision signal, wherein the algorithm or the algorithms are configured to verify the first sensor signal.

It is therefore proposed that the algorithms used through which the decision signals from the installation operator are adjusted are considered to be learning or tuning. This can also be considered to be reinforced learning. Thus, advantageously, wrongly constructed algorithms for verification of the first sensor signal can be adjusted afterwards via the decision signals and can be individually tailored to the installation. In addition, generic algorithms can be adjusted to the individual special agricultural installation.

Preferably, the step of evaluating the first sensor signal with an evaluation module comprises the step of: assessing the first sensor signal in relation to the stored cloud data in respect of its control effectiveness, and determining an effectiveness as a measure of the control effectiveness of the first sensor signal.

It is therefore proposed to determine a value for the effectiveness of a control intervention with the evaluation module. This value can be determined with an algorithm and associated with the first sensor signal. By associating the effectiveness value with the first sensor signal, the installation operator or another algorithm can assess and/or evaluate the value. In addition, this value can be compared with a threshold value and based on this, a control signal, a warning signal, and/or a suggestion for operating parameters or operational settings can be generated. With the aid of the determined effectiveness value, the potential effectiveness of a control intervention compared with other control interventions can be indicated, with which such a value is associated. The most efficient intervention can therefore be identified very easily.

In addition or as an alternative, it is proposed that the step of evaluating the first sensor signal with an evaluation module comprises the step of: assessing the first sensor signal in relation to the stored cloud data in respect of the correct functionality of the sensor device, and determination of a functionality value as a measure of the functionality of the first sensor device.

It is therefore proposed to determine a value for the functionality of the sensor device with the evaluation module. This value may be determined with an algorithm and associated with the first sensor signal. By associating the functionality value with the first sensor signal, the installation operator or another algorithm can assess and/or evaluate the value. In addition, this value can be compared with a threshold value and based on this, a control signal, a warning signal and/or a suggestion for operating parameters or operational settings can be generated. With the aid of the determined functionality value, in this manner, the functionality of a sensor device compared with other sensor devices can be indicated, to which a similar such value is associated. Thus, a defective or damaged sensor device can be identified very easily.

In addition or as an alternative, it is proposed that the step of evaluating the first sensor signal with an evaluation module comprises the step of: assessing the first sensor signal in relation to the stored cloud data in respect of a discrepancy between the sensor signal and the stored cloud data, and determining a value for the discrepancy as a measure for the discrepancy between the first sensor signal and the cloud data.

It is therefore proposed to determine a value for the discrepancy between the first sensor signal and the cloud data with the evaluation module. This value can be determined with an algorithm and associated with the first sensor signal. By associating the discrepancy value with the first sensor signal, the installation operator or another algorithm can assess and/or evaluate the value. In addition, this value can be compared with a threshold value and based on this, a control signal, a warning signal, and/or a suggestion for operating parameters or operational settings can be generated. With the aid of the determined discrepancy value, in this manner, the discrepancy between the first sensor signal and therefore the sensor device and other sensor devices can be indicated, to which a similar such value is associated. Thus, a defective or damaged sensor device can be identified very easily. In addition, a comparison makes it possible to detect trends for the sensor device compared with the other sensor devices.

In addition or as an alternative, it is proposed that the step of evaluating the first sensor signal with an evaluation module comprises the step of: assessing the first sensor signal in relation to the stored cloud data in respect of a plausibility of the sensor signal compared with the stored cloud data, and determination of a plausibility value as a measure of the plausibility of the first sensor signal with respect to the cloud data.

It is therefore proposed that a value for the plausibility of the first sensor signal with respect to the cloud data is determined with the evaluation module. This value can be determined with an algorithm and associated with the first sensor signal. By associating the plausibility value with the first sensor signal, the installation operator or another algorithm can assess and/or evaluate the value. In addition, this value can be compared with a threshold value and based on this, a control signal, a warning signal and/or a suggestion for operating parameters or operational settings can be generated. With the aid of the determined plausibility value, in this manner, the plausibility of the first sensor signal and therefore of the sensor device compared with other sensor devices can be indicated, to which a similar such value is associated. Thus, a defective or damaged sensor device can be identified very easily. In addition, a comparison makes it possible to detect trends for the sensor device compared with the other sensor devices. It is therefore proposed that the sensor values should be monitored in respect of their plausibility. In this manner, both the history (sudden drifting of a sensor value over time, or a jump response without an explanation) as well as the parallelism (selection of data from a plurality of farms, based on similarity criteria for the context and then comparison of the sensor data) and/or the data reconstruction (for example determination of the most probable temperature by processing absolute and relative air humidity) may be useful. In particular, the combination of several of these basic forms of verification which are typical with big data enables a particularly robust data base for a plausibility decision to be set up. These can either be included in an automated method or can be carried out manually.

In addition or as an alternative, it is proposed that the step of evaluating the first sensor signal with an evaluation module comprises the step of: indicating conspicuous first sensor signals after the evaluation, in particular in order to provide the conspicuous sensor signals to a user for verification.

It is therefore proposed that the first sensor signal, if it is assessed to be a conspicuous signal, is made distinguishable and to indicate it. The indication may be made in different manners; as an example, the sensor signal may be indicated optically or acoustically, with an indication means configured for it, such as screen displays, sirens, lights, or the like. In a particularly preferred embodiment, the conspicuous sensor signals are provided to a user for verification. The provision may, for example, be implemented with a terminal. The indication may also be implemented with a list or the like.

Preferably, the method comprises the additional step of: receiving an execution confirmation. More preferably, the execution confirmation is received by an installation operator or an operations centre.

The execution confirmation may also be understood to mean an approval signal. Preferably, the execution confirmation is received via a user interface. Thus, an additional external verification is proposed, which is made by an installation operator or by an operation centre. The operation centre may also be considered to be a control room where data is collected. Thus, an inquiry by a local farmer can be made before carrying out a control operation.

Thus, a specialist or an operator is queried as regards a data situation, for example an interpretation of a camera image containing dead chickens, and provides a treatment recommendation. The inquirer confirms the treatment recommendation for execution with the execution confirmation, declines it, or authorizes a different counter-measure. This may be implemented via a user interface of the installation or via a terminal.

Particularly preferably, after the expiry of a predetermined time period, a control signal for controlling at least one regulator of the agricultural installation is generated if no execution confirmation is received by the control device. Particularly preferably, the control signal is generated if no user input is received via an input interface of the control device. The user input may therefore be considered to be the execution confirmation.

It is therefore proposed to specify a time period within which the execution confirmation should be received. If the predetermined time is exceeded, a control action is automatically initiated by the control device, which generates a control signal which is provided to a regulator. If, for example, an installation operator does not react quickly enough, then the control device initiates a control action. This prevents control interventions from being carried out too late or not at all. The predetermined time period is set with a countdown timer in the control device, for example. Thus, a timeout function is proposed and if a reaction does not occur, an automated control intervention is executed with the control device.

More particularly preferably, schedules are stored in the control device in order to generate a control signal for controlling at least one regulator of the agricultural installation.

In a particularly preferred embodiment, the schedules for execution confirmations differ as a function of time and/or situation.

It is therefore proposed to implement or store schedules in the control device, which are automatically executed by the control device. The schedules comprise predetermined input conditions and output control signals for controlling the regulator of the agricultural installation as starting variables. The schedules may also be considered to be process schedules or control schedules. Preferably, different schedules are implemented for different input conditions in the control device, i.e., several different schedules are implemented in the control device and are initiated differently depending on the situation. Input conditions for initiating the schedules may be approval signals or execution confirmations which are received by the installation operator via a user interface.

Preferably, the method comprises the additional step of: generating a control signal to control at least one regulator of the agricultural installation if a modified sensor value is presented within the predetermined time period.

Thus, in addition to or as an alternative to the countdown timer, it is proposed that a control signal is generated when a modified sensor value is presented, preferably when the first sensor signal and/or the sensor values stored as cloud data change. It is therefore proposed that a control intervention is initiated automatically with a control intervention applied to the agricultural installation when the sensor signals of the sensor devices change further. As an example, it may be that the first sensor signal is shown to an installation operator as being unverified. If the installation operator does not react directly to it, and if the sensor signal changes further, the control device intervenes and executes an automated control. To this end, a control signal is generated when a modified sensor value is presented and preferably when an approval signal is not present.

Preferably, the method comprises the additional step of: indicating the control actions which are initiated.

It is therefore proposed to automatically generate a control history in which the control actions which are initiated are documented. To this end, the initiated control actions may be stored electronically in the form of a list which can be looked up. This list can then be looked up with a terminal and thus the initiated control actions can be indicated. This means that the control actions can then be manually checked retrospectively and any wrong control actions can be detected subsequently. In addition, particularly regularly occurring control actions which are initiated by the control device can be identified. Thus, wrong control actions can be detected and can potentially be remedied in the future.

Preferably, the indication comprises indicating additional information, wherein a control action is introduced by controlling by means of a control signal in order to control at least one regulator of the agricultural installation.

It is therefore proposed that the barn control system or the control device indicates the introduced actions with additional information to the installation operator on site. The installation operator can therefore check the actions together and check them for accuracy. Thus, incorrect control actions can be detected and potentially remedied in the future. It is therefore proposed to indicate additional information to the installation operator locally, which gives the operator an indication as to why a control action or a control intervention has been initiated. This reduces the risk of the control device working against the installation operator, who might want to proceed manually against the automated control intervention. If, for example, the farmer determines that the temperature in the barn is dropping because a lot of cold outside air has been fed in, their initial reaction would be to raise the temperature or to turn off the outside airflow. If, however, additional information is also provided, which then announces "humidity too high, automated humidity reduction cycle using outside air initiated," such confrontations can be avoided.

Preferably, the method comprises the additional step of: adjusting an effect of the cloud data, preferably for a subsequent evaluation on the basis of further cloud data.

It is therefore proposed that the influence of the cloud data can be adjusted, i.e., the action of the cloud data in the evaluation step, in order to verify the first sensor signal. If, for example it is detected that a verification of a first sensor signal is regularly displayed as an error and this error is known, then, for example, the verification of the first sensor signal with the aid of the cloud data can be turned off. In a simple example, in a software program, a verification with the aid of the cloud data is turned off using an input field. In a simple case, the adjustability of the influence of the cloud data can therefore be switching the verification of the first sensor signal with the aid of the cloud data on and off. This is particularly advantageous if a verification has not been successful for some time or new sensor devices are being tested and commissioned. It is preferably proposed that the influence of the cloud data is adjustable for each sensor signal. This may, for example, be carried out in a software program. Preferably, the adjustment of the action of the cloud data is made on the basis of further cloud data for a subsequent evaluation. Thus, it is proposed that the action of the cloud data is adjusted on the basis of other cloud data.

Preferably, the step for storage of the acquired sensor signals as cloud data in the cloud computing device comprises the additional step of: storage of cloud data of other agricultural installations which, with reference to the agricultural installation to be controlled, are in a location with a similar climate; in particular, the location with a similar climate is a location which is not less than 100 km away, and/or with a latitude which is no more than ±10 points of latitude from the location of the installation to be controlled and/or with a height above sea level which differs by less than 300 m from the installation to be controlled and/or which originates from the same province or country.

It is therefore proposed to use sensor signals from other agricultural installations for the verification of the at least one first sensor signal which are operated under similar climatic conditions. Because the location has a similar climate, the other agricultural installation can serve as a comparative installation. Thus, cloud data from another installation may be taken into consideration and the data basis for the installation to be controlled can be enhanced. In addition, for the verification of the first sensor signal, the additional sensor data can be taken into consideration as cloud data and therefore the control interventions are improved with the aid of the additional cloud data. It has been shown that a data basis can be constructed with external data if the incoming cloud data are selected in a manner such that they originate from other agricultural installations, i.e., from agricultural installations at similar latitudes, at similar elevations, and/or in the same country and/or province.

Preferably, the step of storage of the acquired sensor signals as cloud data in the cloud computing device is executed more frequently than every 120 minutes, preferably more frequently than every 30 minutes, particularly preferably more frequently than every 10 minutes.

It is therefore proposed that cloud data is generated regularly and the acquired sensor signals are stored in the cloud computing device. Thus, a current data basis is provided and the verification of the first sensor signal comprises regularly added and up-to-date cloud data. It has been shown that a particularly good data basis for verification exists when the acquired sensor signals which are stored as cloud data in the cloud computing device are uploaded more frequently than every 2 hours, in particular more frequently than every 30 minutes, preferably more frequently than every 10 minutes. Thus, there is a compromise between the quantity of data and timeliness of the data. A lower uploading frequency makes the granularity of the cloud data too coarse. Beyond an uploading interval of more than 120 minutes, fluctuations in the process which are already too great can appear. Thus, for example, a cloud update of once a day is too slow to detect trends and therefore too risky for feedback. This data update frequency is in particular necessary in order to filter out unwanted oscillations and to suppress rogue individual values.

Preferably, a plurality of sensor devices are taken into consideration in the method, in particular more than 100 sensor devices are taken into consideration in the method. In addition or as an alternative, a plurality of sensor devices from other agricultural installations are taken into consideration in the method; in particular, more than 100 sensor devices from other agricultural installations are taken into consideration in the method.

Thus, it is proposed that a plurality of first and/or further sensor devices are used for the verification. By taking a plurality of sensors into consideration, a large and diverse data basis is provided on the basis of which the verification is carried out with the evaluation module. In this manner, the evaluation precision is increased. Thus, a big data system is proposed. Big data refers here to the collection of a large quantity of data, for example of temperature measurements, wherein the quantity of data is so large that its interpretation via manual mechanisms is no longer appropriate. The system not only draws on data from the cloud, but also delivers it to the cloud. Thus, a required data basis is created. It was recognised that taking more than 100 sensors into consideration leads to a suitable data basis.

In addition, it is preferably proposed that more than one control device is used, in particular more than two or four control devices per agricultural installation.

Along with redundancy considerations, in pig farming, for example, one control device per climate zone is used with a cloud connection. A farm typically has one to three houses with several climate zones. In the case of chicken farming, one control device per house is typically used, but a chicken farm typically has six houses. Precisely for such redundancy considerations, several control devices are advised: because the construction of the houses is often identical, then one sensor or control failure can, at least in an emergency, be operated via the cloud data from other houses taking into consideration the variations which are shown up by the overall cloud data in an emergency operation.

Preferably, the method comprises the additional step of: determining a measure for a discrepancy and/or for a reliability of the first sensor signal in relation to the stored cloud data.

It is therefore proposed that a specific value is determined for a discrepancy and/or a reliability of the first sensor signal. The determination is preferably carried out with the evaluation module, which is configured to determine the measure for the discrepancy and/or for the reliability of the first sensor signal in relation to the stored cloud data. As an example, the measure is a percentage between 0% and 100%, wherein 100% describes agreement or a reliability and 0% describes a complete discrepancy and no reliability. A scale or the like may also be envisaged as the measure. The measure for the discrepancy and/or the reliability may be used in order to assess the sensor signal more easily or to initiate control actions based on the value.

More preferably, the method comprises at least one of the following steps: generating one or more verified control signals and/or verified warning signals and/or verified suggestions, wherein the verified control signal and/or the verified warning signal and/or the verified suggestion is generated as a function of the measure of the discrepancy and/or of the reliability; and/or adjusting or modifying the first sensor signal as a function of the measure of the discrepancy and/or of the reliability.

It is therefore proposed that a control signal, a warning signal, and/or a suggestion is generated on the basis of the determined value for the discrepancy and/or the reliability. The production of the control signal, the warning signal, and/or the suggestion is carried out here as a function of the discrepancy and/or reliability, i.e., the specification of threshold values and/or limiting values is proposed for the measure of the discrepancy and/or of the reliability. The said actions can then be initiated on the basis of these values.

Preferably, the method comprises the following step: modifying or adjusting the first sensor signal in relation to the cloud data after the verification, so that the first sensor signal, after the modification or adjustment, differs less from the cloud data; and/or interpolating several first sensor signals and/or several further sensor signals with an interpolation function, and modifying or adjusting the first sensor signal as a function of the interpolation function in order to provide an interpolated first sensor signal for controlling the agricultural installation.

It is therefore proposed that the first sensor signal is automatically adjusted or modified in relation to the cloud data after the verification, namely in a manner such that after the modification or adjustment, the first sensor signal differs less from the cloud data. If, for example, with the aid of the comparison with the cloud data, the evaluation determines that a sensor device has a constant discrepancy from other sensors or has an inaccurate measurement range, the first sensor signal can be adjusted and/or modified on the basis of the further sensor signals. Thus, for example, an inaccurate temperature sensor can be overwritten with new and more accurate measured values by taking other temperature sensors into consideration. As an example, the new values for the sensor signal may be a mean over sensors of similar type. In addition or as an alternative, it is proposed that an interpolation of several first sensor signals and/or several further sensor signals is carried out with an interpolation function and modification or adjustment of the first sensor signal is carried out in relation to the interpolation function in order to provide an interpolated first sensor signal for controlling the agricultural installation. Thus, for example, an inaccurate measurement signal from the first sensor device can be improved. In principle, any function may be used as the interpolation function; as an example, averaging or a Newton interpolation or the like may be carried out. Thus, for example, the replacement of an inaccurate measurement signal of a temperature sensor by an averaged measurement signal may be envisaged. The modification and/or adjustment may also be by supplementing the data. It is therefore proposed that the action of the cloud data can be adjusted situationally and/or a measure of the action of the cloud data is dependent on other cloud data. Thus, for example, the measure of the autonomy of the control may be restricted on site by the farmer or the influence of external data may be completely switched off. This prevents incorrect cloud data from leading to incorrect control interventions.

Preferably, it is proposed that the content of the control parameters and/or the cloud data are modified, in fact generated, by cloud computing.

Preferably, the control device is part of a closed-loop control system. In control, a machine or installation is influenced with the aid of a manipulated variable without the control variable feeding back to the manipulated variable. Closed-loop control is a process in which the actual value of a variable is measured and is aligned with the nominal value by adjustment. Thus, in the present case, it is proposed that the control device is a closed-loop control system which is part of a closed-loop control, for example the controller, and that this receives actual variables and compares them with a nominal variable. The control device then controls a regulator of the agricultural installation on the basis of the comparison between the nominal and actual variable in order to reduce the errors between the nominal and actual variable.

Preferably, the closed-loop control is a closed-loop control with optimisation of different nominal parameters. Particularly preferably, the different nominal parameters have a priority which can be configured differently. Thus, it is proposed that the control device comprises several nominal variables, i.e., it is a multi-input and multi-output controller. Preferably, different nominal parameters are implemented in the control device and these have priorities which can be configured differently. The different priorities may, for example, be set with adjustable weighting factors which scale the influence of the corresponding nominal variable.

Preferably, it is proposed that the step of evaluating the first sensor signal with the evaluation module comprises the additional step of: evaluating the cloud data in an online mode of the control device, when a regular data connection with the cloud computing device is detected, and switching to a local mode of the control device when no regular data connection with the cloud computing device is detected.

It is therefore proposed that the control device has an online mode and a local mode. In online mode, the control device draws the stored cloud data from the cloud computing device. In local mode, which is also considered to be the offline mode, the control device does not draw any cloud data from the cloud computing device, but rather locally stored cloud data or sensor data. These may also be considered to be local data. Local data are data which are available for a control decision and which can be obtained both directly from a sensor as well as by accumulation of different sensor data, i.e., locally in the agricultural installation. Thus, in the case in which the cloud data drops out, no incorrect control interventions are made. Thus, when the cloud data drops out, the controller functions autonomously because of the local data. The control system for the agricultural installation is therefore expanded, in that when cloud data is available, it incorporates it into the control process, but it can also operate autonomously in offline mode.

As a precautionary measure, in the case in which cloud data availability drops out, it is proposed that specific data, in particular data which may be useful in the future, is stored locally in order to provide data retention.

Preferably, the method comprises the additional step of: processing data stored locally in the control device and/or stored cloud data by means of a machine learning algorithm and/or by means of a big data algorithm and/or by means of a cloud computing algorithm, in particular in order to verify the first sensor signal. It is therefore proposed to use a machine learning algorithm in order to verify the first sensor signal. An example of a machine learning algorithm is an artificial neural network. The term "machine learning algorithm" may therefore also be considered to be an algorithm which is adaptive and can be modified by training processes. In addition or as an alternative, a big data algorithm may also be provided. Known examples of machine learning algorithms and/or big data algorithms are Bayes classifiers, cluster methods, decision trees, fuzzy classifiers, artificial neural networks, and/or classification methods, in particular the state vector machine.

Preferably, the method comprises the additional step of: generating one or more verified control signals in order to control at least one regulator of the agricultural installation, wherein the verified control signal is a control signal which is generated on the basis of the combined evaluation of the first sensor signal and the cloud data, only when an approval signal is received via a user interface. Thus, a semi-automated control of the regulator of the agricultural installation is proposed which is only carried out when an approval signal is present.

In a further aspect of the invention, a control system is proposed for controlling an agricultural installation for small livestock farming and/or medium livestock farming. It comprises a first sensor device for acquiring at least one first sensor signal, wherein the first sensor device is part of the agricultural installation and is configured to measure a process variable and/or state variable of the agricultural installation; a plurality of sensors distributed locally in the agricultural installation for acquiring a plurality of further sensor signals and/or a plurality of sensors distributed locally in another agricultural installation for acquiring a plurality of further sensor signals, wherein the distributed sensor devices are configured for measuring process variables and/or state variables of the agricultural installation; a cloud computing device for storage of the acquired sensor signals as cloud data; and a control device for controlling the agricultural installation, wherein the control device has an evaluation module for evaluating the first sensor signal, wherein the evaluation comprises taking at least a portion of the stored cloud data into consideration in order to verify the first sensor signal in relation to the stored cloud data with the evaluation module.

The advantages, discussions, and definitions in respect of the method described above are also applicable in an analogous manner to the control system described above and below and its preferred embodiments.

Preferably, the control device is configured to generate a verified control signal for controlling at least one regulator of the agricultural installation, wherein the verified control signal is a control signal which is generated on the basis of the combined evaluation of the first sensor signal and the cloud data, and/or the control device is configured to generate a verified warning signal in order to indicate a warning and/or a perturbation of the agricultural installation, wherein the verified warning signal is a warning signal which is generated on the basis of the combined evaluation of the first sensor signal and the cloud data, and/or the control device is configured to generate a verified suggestion for optimized operating parameters of the agricultural installation, wherein the verified suggestion is a suggestion for optimised operating parameters, which is generated on the basis of the combined evaluation of the first sensor signal and the cloud data.

Preferably, the control system for carrying out the method is configured in accordance with one of the preceding embodiments and in order to carry out the method, has at least the first sensor device, the distributed sensor devices, the cloud computing device and the control device.

More preferably, in order to carry out the method, the control system additionally has a display for indicating verified warning signals, a display for indicating verified suggestions for optimized operating parameters, a concentration module for receiving the acquired sensor signals as raw data and for processing the raw data as cloud data, and/or a user interface for receiving user inputs which are taken into consideration in the control device.

In accordance with a further aspect of the invention, a computer program product is proposed, comprising commands which, when the computer program product is executed by a computer, enables it to carry out the steps of the method in accordance with one of the preceding embodiments.

In accordance with a further aspect of the invention, a computer-readable storage medium is proposed which comprises commands which, when executed by a computer, enable it to carry out the steps of the method in accordance with one of the preceding embodiments.

In accordance with a further aspect of the invention, a computer-readable data carrier is proposed on which the computer program product in accordance with one of the preceding embodiments is stored.

In accordance with a further aspect of the invention, a data carrier signal is proposed which transfers the computer program product according to one of the preceding embodiments.

Preferably, the use of a plurality of cameras is proposed which monitor two regions in the agricultural installation and between which the small and/or medium livestock can move.

Preferably, an overlapping region of the camera is selected in a manner such that object recognition of the small and/or medium livestock in the region of the overlapping region can be interpreted. This is preferably carried out in that both cameras can recognise the livestock in the overlapping region and then a higher-level system excises livestock which has been detected twice and/or ensures that object recognition from the results of the camera is only carried out in a higher-level system by means of a unified abstraction layer over a scene. Thus, half-visible livestock can be taken into consideration in an overall interpretation. This increases the precision of the data basis.

Preferably, a first sensor signal is generated from a plurality of sensor signals by means of higher-level interpretation mechanisms.

Preferably, a plurality of cameras are used as sensor devices, in particular 3D cameras.

Particularly preferably, the cameras have adjacent viewports, i.e., adjacent recording zones.

In a particularly preferred embodiment, camera signals from a plurality of cameras are taken into consideration in order to provide a situative assessment.

Preferably, a high resolution camera is proposed as the first sensor device and/or further sensor device. Because it may occur that the livestock does not distribute itself evenly, it is proposed to use a plurality of high resolution cameras. Thus, by means of an algorithm and by means of a plurality of high resolution cameras per possible object, one interpretation per viewport is carried out and then the viewport transitions are compared in a manner such that the number of livestock and their position is determined over an entire scene. By using a plurality of high resolution cameras, a higher reliability is provided by the combination of cameras.

Preferably, the first sensor signals and at least individual actions based on them are stored as cloud data. In addition, preferably, it is proposed that the cloud device is configured to determine data development, i.e., to detect trends or to determine trends. When determining a discrepancy or a trend, the cloud device can react accordingly and countermeasures may be initiated. In this regard, different weightings of a risk may be configured or parameterized in the control device. Thus, in respect of weight gain, wellbeing of the animal, specifications, operating conditions, etc., this can be optimised. Depending on the measurement of the risk, different actions may be engaged, for example logging, suggestions for modifications to the farmer, automated actions after approval by the farmer may be initiated, or automated actions may be initiated without further inquiry.

The present invention will now be described in more detail by way of example with the aid of exemplary embodiments and with reference to the accompanying figures, wherein the same reference symbols are used for identical or similar components:

DETAILED DESCRIPTION OF THE EMBODIMENTS

Figure 1:
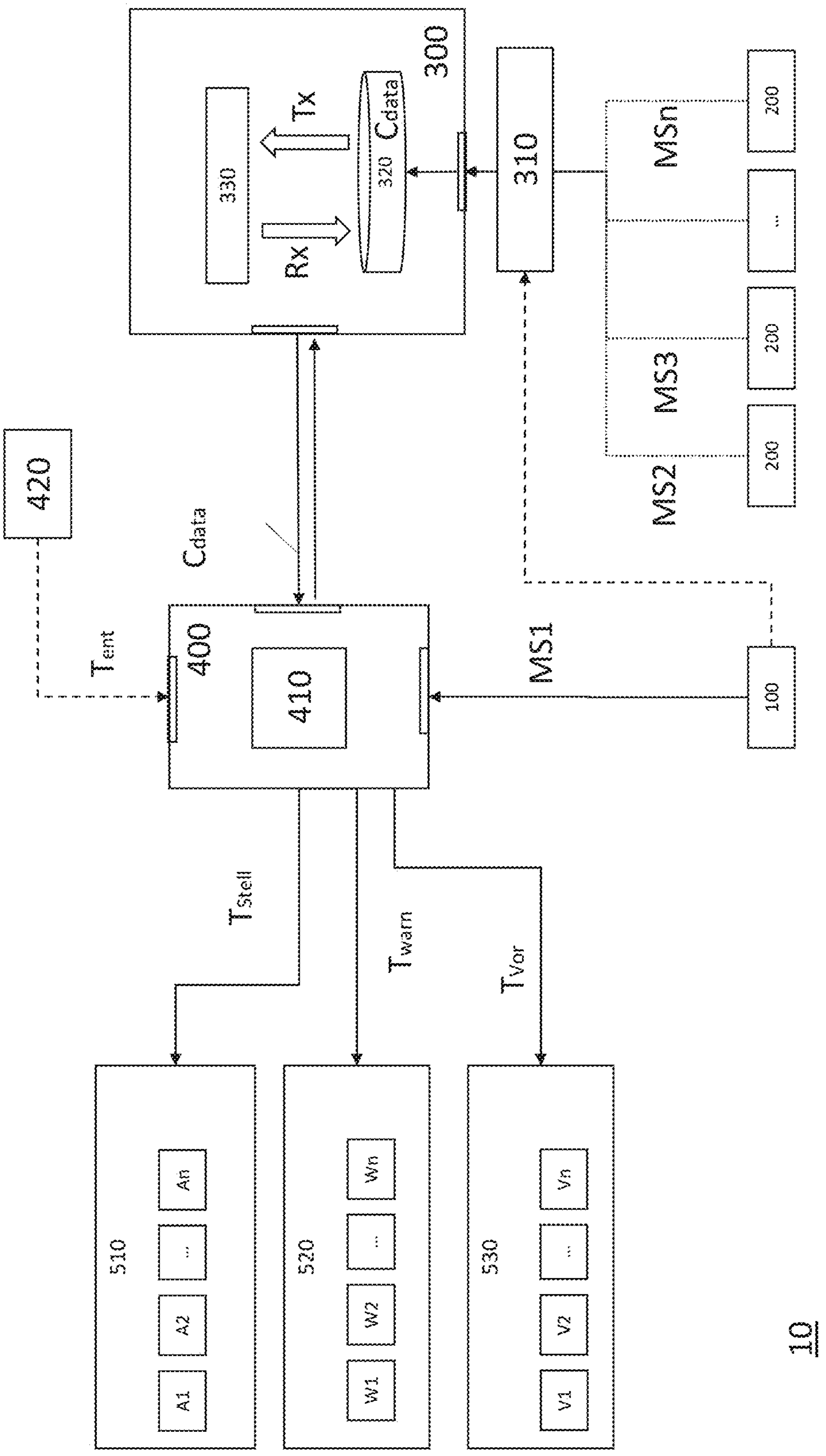
FIG. 1 diagrammatically shows a control system for controlling an agricultural installation for small livestock farming and/or medium livestock farming in an embodiment in accordance with the invention.

FIG. 1 diagrammatically shows a control system 10 for controlling an agricultural installation for small livestock farming and/or medium livestock farming.

The control system 10 comprises a first sensor device 100 for acquiring at least one first sensor signal MS1, wherein the first sensor device 100 is part of the agricultural installation and is configured to measure a process variable and/or state variable of the agricultural installation.

The control system 10 additionally comprises a plurality of sensors 200 distributed locally in the agricultural installation for acquiring a plurality of further sensor signals MS2 to MSn and/or a plurality of sensors 200 distributed locally in another agricultural installation for acquiring a plurality of further sensor signals MS2 to MSn, wherein the distributed sensor devices 200 are configured to measure process variables and/or state variables of the agricultural installation.

The control system 10 additionally comprises a cloud computing device 300 for storage of the acquired sensor signals MS2 to MSn as cloud data, Cdata. The storage of the first sensor signal MS1 is optional.

In addition, the control system 10 comprises a control device 400 for controlling the agricultural installation, wherein the control device 400 has an evaluation module 410 for evaluating the first sensor signal, MS1, wherein the evaluation comprises taking into consideration at least a portion of the stored cloud data, Cdata, in order to verify the first sensor signal MS1 in relation to the stored cloud data, Cdata, with the evaluation module 410.

FIG. 1 also shows that the control device 400 is configured to produce one or more verified control signals, TStell, for controlling at least one regulator A1 to An of the agricultural installation, wherein the verified control signal is a control signal.

FIG. 1 also shows that the control device 400 is configured to produce one or more verified warning signals, Twarn, to indicate a warning and/or to indicate a perturbation of the agricultural installation. The warnings and/or perturbations can be signalled with signalling means or display means W1 to Wn.

FIG. 1 also shows that the control device 400 is configured to produce one or more verified suggestions, Tvor, for optimised operating parameters or for operational settings of the agricultural installation. The suggestions can be indicated on or with display means V1 to Vn.

In addition, FIG. 1 illustrates receipt of the acquired sensor signals as raw data in a concentration module 310 and processing the raw data with the concentration module 310 and storage of the processed raw data in the cloud device 300 as cloud data.

In addition, FIG. 1 illustrates the provision of a user interface 420 for receiving decision signals, Tent, and for taking them into consideration in the decision module 410.

In addition, FIG. 1 demonstrates the function of the cloud computing device. This comprises a cloud module 330 which can also be considered to be a cloud application. This application is connected to a cloud database system 320 via an interface. The cloud application sends a database request, Rx, to the cloud database system 320. It responds with the provision of the requested cloud data, Tx.

Figure 2:
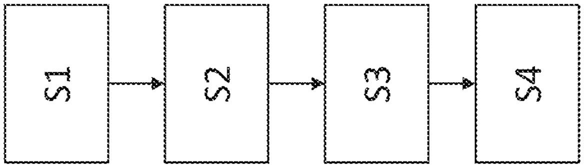
FIG. 2 diagrammatically shows a flow diagram for the method in accordance with the invention for controlling an agricultural installation for small livestock farming and/or medium livestock farming.

FIG. 2 diagrammatically shows a flow diagram for a method for controlling an agricultural installation for small livestock farming and/or medium livestock farming.

The method comprises the step S1: acquiring at least one first sensor signal of a first sensor device of the agricultural installation, wherein the first sensor device is configured for measuring a process variable and/or state variable in the agricultural installation. The first sensor signal is, for example, the sensor signal MS1 from the sensor device 100, as can be seen in FIG. 1. The sensor device 100 is therefore, for example, a camera system and the first sensor signal MS1 is an image signal which describes the current optical state of the agricultural installation in the region of the image scanned by the camera, as a state variable.

In addition, the method comprises the step S2: acquiring a plurality of further sensor signals from locally in the agricultural installation and/or from sensor devices distributed locally in another agricultural installation, wherein the distributed sensor devices are configured to measure process variables and/or state variables in the agricultural installation. The plurality of the further sensor signals are, for example, the sensor signals MS2 to MDn of the sensor devices 200, as shown in FIG. 1. The sensor devices 200 are, for example, sensors for monitoring a barn climate in the agricultural installation, such as temperature sensors, noise sensors, light sensors, or the like. The distributed sensors 200 characterize the current state as regards temperature, the level of noise and light in the agricultural installation as state variables.

In addition, the method comprises the step S3: storing the acquired sensor signals as cloud data in a cloud computing device. The cloud computing device is, for example, configured as shown in FIG. 1 with a cloud module 330 or a cloud application and a cloud database system 320. It is envisaged that at least the acquired further sensor signals of the distributed sensors 200 are stored in the cloud, but in addition, the first sensor signal may also be stored in the cloud computing device.

In addition, the method comprises the step S4: evaluating the first sensor signal with an evaluation module, wherein the evaluation module is part of a control device of the agricultural installation and wherein the evaluation comprises taking at least a portion of the stored cloud data into consideration, in order to verify the first sensor signal in relation to the stored cloud data. The evaluation module is, for example, part of a control device, as shown in FIG. 1.

The method shown in FIG. 2 comprises further preferred steps which are not shown in FIG. 2. The preferred steps have been described above.

Figure 3:
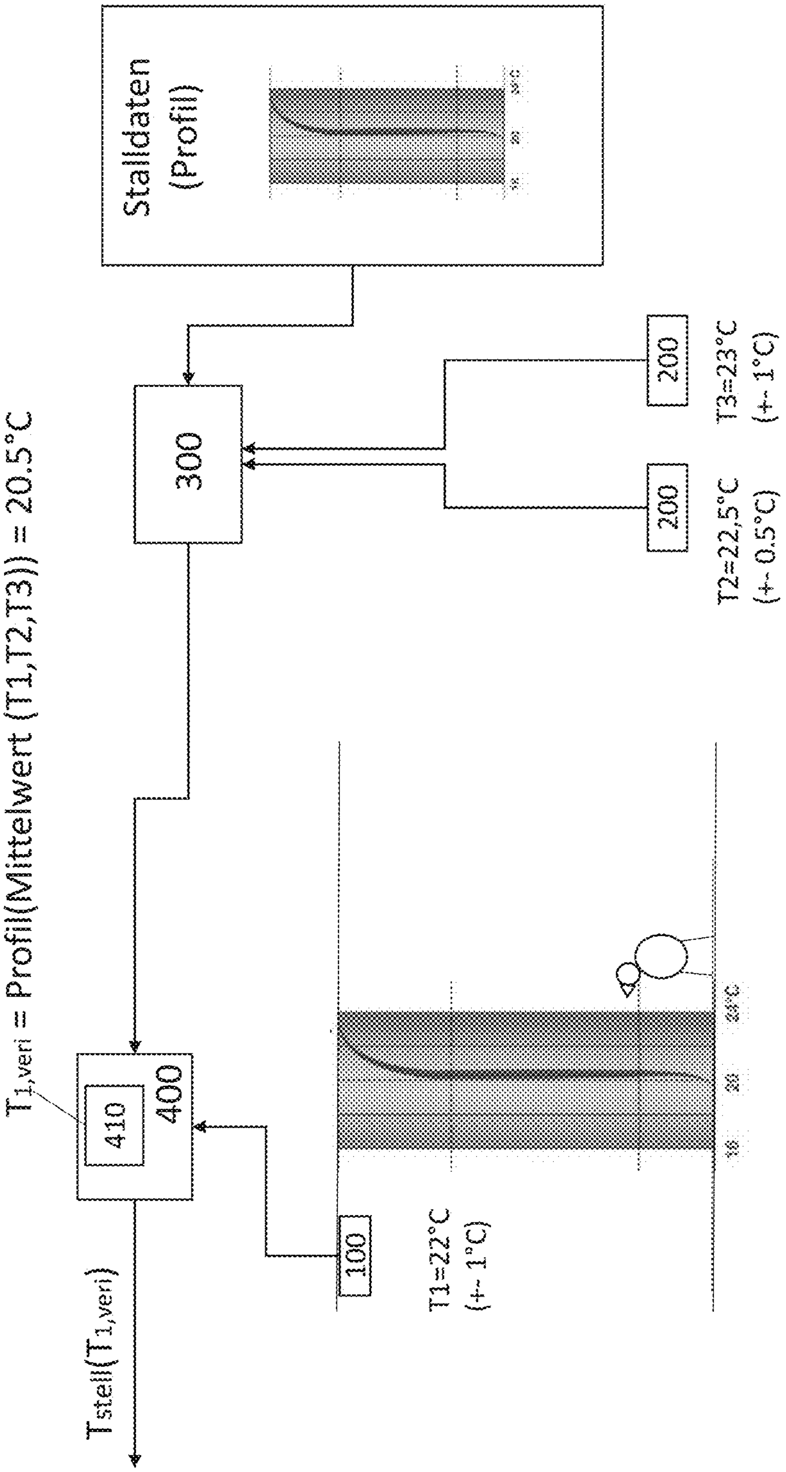
FIG. 3 diagrammatically shows a first exemplary embodiment of the proposed control method or control system.

FIG. 3 shows a first exemplary embodiment, in which the quality of the first sensor signal is improved by external data from a specific cloud.

Because the values from many sensors are stored in a higher-level system, i.e., in the cloud, these are available both for a local evaluation by retaining data on a local system, and also directly in online mode.

FIG. 3 shows that a temperature sensor T1 with an accuracy of ±1 degrees Celsius measures an ambient temperature T1, for example 22° C. This means that the temperature T1 used in the control device 400 would normally be rounded to the nearest degree. In addition, in almost every space there is a temperature stratification which is height-dependent, which can be stored as temperature data or as a temperature profile as cloud data.

The accuracy of T1 is not sufficient in precision farming to control or regulate the described optimized production mechanisms, because the temperature delivered by the sensor differs by 2-3 degrees from the optimum temperature for rearing. It is now proposed to improve or to verify the temperature sensor T1 with additional data from the cloud device 300. To this end, in FIG. 3, further data from the sensors 200 as well as barn data are taken into consideration. By taking the additional data from the cloud into consideration, it can, for example, be determined that the temperature value T1=22° C. is not correct and a new verified value, T1,veri, is determined which corresponds to the actual value more accurately. This new value can then be used in the control device 400 in order to produce a sensor signal Tstell. In order to produce the new verified value, T1,veri, an algorithm is stored in the evaluation module. An example of an algorithm would be firstly to calculate a mean value from the three temperature sensors 100 to 200, and then to map the mean on a profile or on a look-up table and at the height of a chicken. Thus, a new value, T1,veri, can be generated and the exact temperature directly at chicken height can be determined. The control intervention which is generated is therefore more accurate and the overall efficiency of the installation increases.

Figure 4:
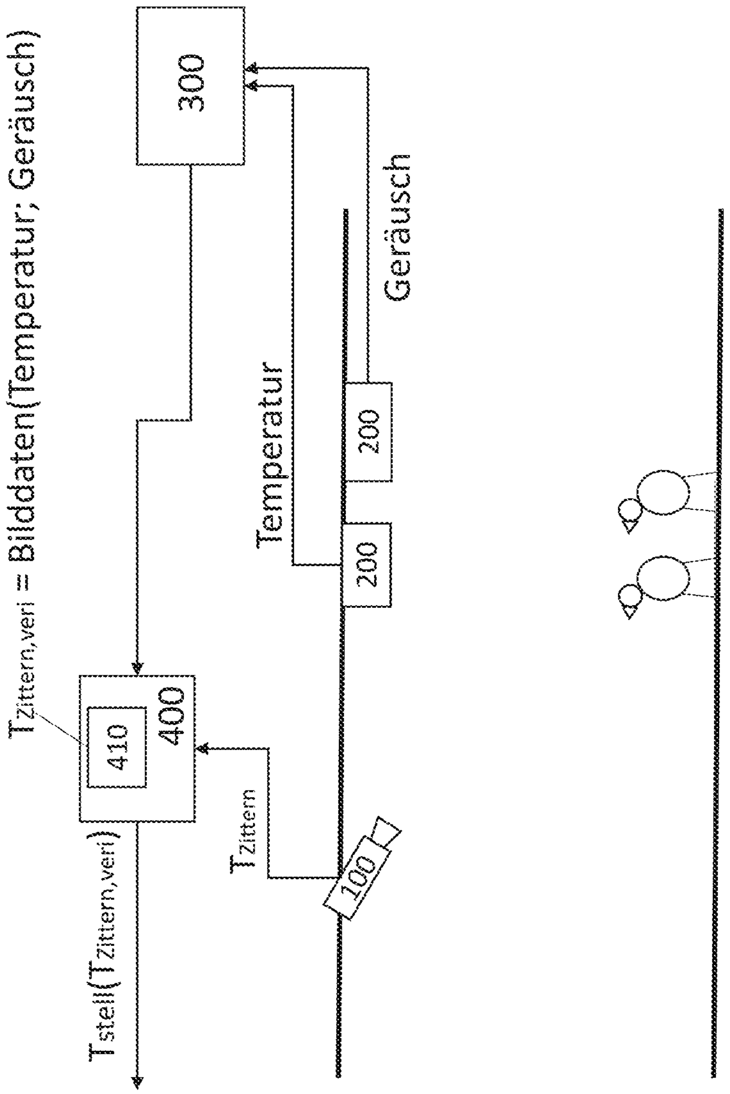
FIG. 4 diagrammatically shows a second exemplary embodiment of the proposed control method or control system.

FIG. 4 shows a second exemplary embodiment in which the quality of the first sensor signal is improved by external data from a specific cloud.

FIG. 4 shows that the prediction of an image interpretation considered in isolation might not be strong enough to be able to derive actions from it, which could have a negative effect on the wellbeing of the animal (for example, it could lead to death due to hyperthermia or hypothermia) or on weight gain. Accordingly, in order to confirm a camera interpretation, other sensor values from the barn (for example the mean of the temperature sensors in the barn) are taken into consideration, which together can result in a stronger predictive strength than the pure camera image itself. This is shown in FIG. 4 by a first sensor device 100 configured as a camera and the temperature sensors 200. In addition, an acoustic sensor 200 is provided to monitor the background noises.

The control device 400 is therefore configured with the evaluation module 410 to compare and verify the image signal, Tzittern, by means of cloud data. As an example, the camera image automatically detects that the monitored chickens are shivering, which is shown diagrammatically in FIG. 4. With the aid of the additional evaluation with the aid of the cloud data, which include temperature data and noise data, the image signal, Tzittern, can be verified and it can, for example, be verified that they are shivering from cold if the temperature is low and no loud noises have been detected.

The invention claimed is:

1. A method for controlling an agricultural installation for small or medium livestock farming, including chicken farming or pig farming, comprising the steps of:

acquiring at least one first sensor signal of a first sensor device of the agricultural installation, wherein the first sensor device is configured for measuring a process variable or state variable in the agricultural installation;

acquiring a plurality of further sensor signals from sensor devices distributed locally in the agricultural installation or from sensor devices distributed locally in another agricultural installation, wherein the distributed sensor devices are configured to measure process variables or state variables in the agricultural installation;

storing the acquired sensor signals as cloud data in a cloud computing device; and evaluating the first sensor signal with an evaluation module, wherein the evaluation module is part of a control device of the agricultural installation or part of a cloud computing device, wherein the evaluation comprises taking at least a portion of the stored cloud data into consideration to verify the first sensor signal in relation to the stored cloud data generating one or more verified control signals to control at least one regulator of the agricultural installation, wherein:

the verified control signal is a control signal which is generated based on the combined evaluation of the first sensor signal and the cloud data, the verified control signal is generated when the preceding evaluation has confirmed that the first sensor signal is a verified sensor signal indicating that the sensor signal has been classified by the evaluation as being sufficiently correct or reliable, and the generating of the verified control signal comprises controlling at least one regulator selected from a group consisting of fans, lamps, pumps, motors, or door openers, to adjust an operating condition of the agricultural installation; and generating one or more verified suggestions for optimized operating parameters or operational settings of the agricultural installation, wherein:

the verified suggestion is a suggestion which is generated based on the combined evaluation of the first sensor signal and the cloud data, and the verified suggestion is generated when the preceding evaluation has concluded that the first sensor signal is not a verified sensor signal indicating that the first sensor signal has been classified by the evaluation as being not sufficiently accurate or not reliable.

2. The method as claimed in claim 1, wherein before storage of the cloud data in the cloud computing device and/or the agricultural installation, at least one of the following steps is carried out:

receiving the acquired sensor signals as raw data in a concentration module; or processing the raw data with the concentration module and storing the processed raw data as cloud data.

3. The method as claimed in claim 2, wherein processing of the raw data comprises anonymising the cloud data, compression, encoding and/or categorisation of the raw data.

4. The method as claimed in claim 1, wherein the step for storage of the acquired sensor signals as cloud data in the cloud computing device comprises the additional step of:

storing cloud data of other agricultural installations which, with reference to the agricultural installation to be controlled, are in a location:

with a similar climate which is not less than 100 km away from the agricultural installation to be controlled;

with a latitude which is no more than +10 points of latitude from the location of the installation to be controlled;

with a height above sea level which differs by less than 300 m from the installation to be controlled; and/or which originates from the same province or country as the agricultural installation to be controlled.

5. The method as claimed in claim 4, wherein the step of storage of the acquired sensor signals as cloud data in the cloud computing device is executed more frequently than every 120 minutes.

6. The method as claimed in claim 1, wherein the method comprises the additional step of:

generating one or more verified control signals to control at least one regulator of the agricultural installation, wherein:

the one or more verified control signals is a control signal generated on the basis of the combined evaluation of the first sensor signal and the cloud data;

the one or more control signals is part of a closed-loop control system of the agricultural installation; or the one or more control signals are prioritised and have priorities which can be configured differently.

7. The method as claimed in claim 1, wherein the method comprises the additional step of:

generating one or more verified warning signals to indicate a warning and/or to indicate a perturbation of the agricultural installation, wherein the verified warning signal is a warning signal which is generated on the basis of the combined evaluation of the first sensor signal and the cloud data.

8. The method as claimed in claim 1, wherein the method comprises the additional steps of:

generating one or more verified suggestions for optimised operating parameters or operational settings of the agricultural installation, wherein the verified suggestion is a suggestion which is generated based on the combined evaluation of the first sensor signal and the cloud data; and/or executing at least one action after detection of a discrepancy between the first sensor signal and the stored cloud data from the list of actions including:

providing an extract of the first sensor signal and recorded cloud data;

indicating a suggestion for modifying the operating parameters or for operational settings of the agricultural installation; or indicating a suggestion for a control of a regulator of the agricultural installation;

wherein an actuation of said actions is executed in relation to a specific measurement of the detected discrepancy.

9. The method as claimed in claim 1, wherein the measured process variable and/or state variable of the first sensor device and/or the measured process variables and/or state variables of the distributed sensor devices are variables for characterizing a barn climate in the agricultural installation, and the process variables and/or state variables are variables from the list including:

a process variable and/or state variable for characterizing a harmful gas concentration (CO, $CO_2$, $H_2S$, $NH_3$);

a process variable and/or state variable for characterizing a brightness value for light, including during the diurnal cycle, selected from a group consisting of;

a process variable and/or state variable for characterizing a composition of the light;

a process variable and/or state variable for characterizing an amount of fresh air;

a process variable and/or state variable for characterizing a movement of air;

a process variable and/or state variable for characterizing a dust concentration;

a process variable and/or state variable for characterizing a temperature;

a process variable and/or state variable for characterizing a humidity; and a process variable and/or state variable for characterizing a level of noise;

wherein the variables for characterizing the barn climate are measured with at least one barn climate sensor comprising any of a barn climate sensor selected from a group consisting of a gas sensor, a light sensor, a flow sensor, a dust sensor, a temperature sensor, and/or a humidity sensor.

10. The method as claimed claim 1, wherein the measured process variable and/or state variable of the first sensor device and/or the measured process variables and/or state variables of the distributed sensor devices are variables for characterizing a physiological and/or ethological mechanism of a behaviour of a farm animal in the agricultural installation, and the process variables and/or state variables are variables selected from a group consisting of:

a process variable and/or state variables for characterizing wallowing of the farm animals;

a process variable and/or state variables for characterizing piling of the farm animals;

a process variable and/or state variables for characterizing seeking shade in the farm animals;

a process variable and/or state variables for characterizing shivering of the farm animals from cold;

a process variable and/or state variables for characterizing panting of the farm animals; and a process variable and/or state variables for characterizing the food intake of the farm animals;

wherein the variables for characterizing the physiological and/or ethological mechanism of a behaviour of the farm animal in the agricultural installation are measured with a camera system configured with an image recognition algorithm for detecting a physiological and/or ethological mechanism in the farm animal behaviour, and configured for recording and evaluating a profile of the movement of individual farm animals.

11. The method as claimed in claim 1, wherein the method comprises the additional steps of:

using a camera system as the first sensor device, which is equipped with an image recognition algorithm for detecting a physiological and/or the ethological mechanism in the farm animal behaviour;

using barn climate sensors as the distributed sensor devices for measuring variables for the characterization of a barn climate in the agricultural installation; and evaluating the first sensor signal presented as a camera signal from the first sensor device with the evaluation module, wherein the evaluation comprises taking at least a portion of the stored cloud data into consideration to verify the physiological and/or the ethological mechanism in the farm animal behaviour measured with the camera system in relation to the variables stored as cloud data for the characterization of the barn climate in the agricultural installation.

12. The method as claimed in claim 1, wherein the step of evaluating the first sensor signal with an evaluation module comprises the additional step of:

using a machine learning algorithm to evaluate the first sensor signal and the stored cloud data to verify the first sensor signal in relation to the stored cloud data with the machine evaluation algorithm, wherein:

the machine learning algorithm is a trained artificial neural network for verifying the first sensor signal and the stored cloud data to verify the first sensor signal in relation to the stored cloud data with the trained neural network; or a cloud-based machine learning algorithm is used which is configured in the cloud computing device.

13. The method as claimed in claim 1, wherein the method comprises the additional step of:

providing a user interface for receiving decision signals and for consideration in the decision module after generating a verified warning signal and/or after generating a verified suggestion for optimised operating parameters, wherein:

a verified control signal for controlling at least one regulator of the agricultural installation is generated based on the decision signal; and/or adjustment of a machine learning algorithm, a big data algorithm, and/or a cloud computing algorithm is carried out based on the decision signal, wherein the algorithm or the algorithms are configured to verify the first sensor signal.

14. The method as claimed in claim 1, wherein the step of evaluating the first sensor signal with an evaluation module comprises the additional step(s) of:
- assessing the first sensor signal in relation to the stored cloud data in respect of its control effectiveness, and determining an effectiveness as a measure of the control effectiveness of the first sensor signal;
- assessing the first sensor signal in relation to the stored cloud data in respect of the correct functionality of the sensor device, and determination of a functionality value as a measure of the functionality of the first sensor device;
- assessing the first sensor signal in relation to the stored cloud data in respect of a discrepancy between the sensor signal and the stored cloud data, and determining a value for the discrepancy as a measure of the discrepancy between the first sensor signal and the cloud data;
- assessing the first sensor signal in relation to the stored cloud data in respect of a plausibility of the sensor signal compared with the stored cloud data, and determining a plausibility value as a measure of the plausibility of the first sensor signal with respect to the cloud data; and/or
- indicating conspicuous sensor data after the evaluation to provide the conspicuous sensor data to a user for verification.

15. The method as claimed in claim 1, wherein the method comprises the additional step of:
- receiving an execution confirmation from the installation operator or an operations centre, wherein;
- after the expiry of a predetermined time period, a control signal for controlling at least one regulator of the agricultural installation is generated if no execution confirmation is received by the control device; and
- schedules are stored in the control device to generate a control signal for controlling the at least one regulator of the agricultural installation, wherein the schedules for execution confirmations differ as a function of time and/or situation.

16. The method as claimed in claim 1, wherein the method comprises the additional step of:
- generating a control signal to control at least one regulator of the agricultural installation if a modified sensor value is presented within a predetermined time period.

17. The method as claimed in claim 1, wherein the method comprises the additional step of:
- indicating the control actions which are initiated with additional information, wherein a control action is initiated by controlling by a control signal to control at least one regulator of the agricultural installation.

18. The method as claimed in claim 1, wherein the method comprises the additional step of:
- adjusting an effect of the cloud data for a subsequent evaluation based on further cloud data.

19. The method as claimed in claim 1, wherein
- a plurality of sensor devices are taken into consideration in the method, wherein the plurality of sensor devices comprises more than 100 sensor devices taken into consideration in the method; and/or
- a plurality of sensor devices from other agricultural installations are taken into consideration in the method wherein the plurality of sensor devices for other agricultural installations comprises more than 100 sensor devices from other agricultural installations taken into consideration in the method.

20. The method as claimed in claim 1, wherein the method comprises the additional step(s) of:
- determining a measure for a discrepancy and/or for a reliability of the first sensor signal in relation to the stored cloud data;
- generating one or more verified control signals, verified warning signals, and/or verified suggestions, wherein the verified control signal, the verified warning signal, and/or the verified suggestion is generated as a function of the measure of the discrepancy and/or of the reliability; and/or
- adjusting or modifying the first sensor signal as a function of the measure of the discrepancy and/or of the reliability.

21. The method as claimed in claim 1, wherein the method comprises the additional step(s) of:
- modifying or adjusting the first sensor signal in relation to the cloud data after the verification, so that the first sensor signal, after the modification or adjustment, differs less from the cloud data; and/or
- interpolating several first sensor signals and/or several further sensor signals with an interpolation function and modifying or adjusting the first sensor signal as a function of the interpolation function to provide an interpolated first sensor signal for controlling the agricultural installation.

22. The method as claimed in claim 1, wherein the control device is part of a closed-loop control system with optimization of different nominal parameters and the different nominal parameters have a priority which can be configured differently.

23. The method as claimed in claim 1, wherein the step of evaluating the first sensor signal with the evaluation module comprises the additional step of:
- evaluating the cloud data in an online mode of the control device, when a regular data connection with the cloud computing device is detected, and switching to a local mode of the control device when no regular data connection with the cloud computing device is detected.

24. The method as claimed in claim 1, wherein the method comprises the additional step of:
- processing data stored locally in the control device and/or stored cloud data by a machine learning algorithm, a big data algorithm, and/or a cloud computing algorithm to verify the first sensor signal.

25. The method as claimed in claim 1, wherein the method comprises the additional step of:
- generating one or more verified control signals to control at least one regulator of the agricultural installation, wherein the verified control signal is a control signal which is generated based on the combined evaluation of the first sensor signal and the cloud data, only when an approval signal is received via a user interface.

26. A control system for controlling an agricultural installation for small livestock farming and/or medium livestock farming, comprising:
- a first sensor device for acquiring at least one first sensor signal, wherein the first sensor device is part of the agricultural installation and is configured to measure a process variable and/or state variable of the agricultural installation;
- a plurality of sensors distributed locally in the agricultural installation for acquiring a plurality of further sensor signals and/or a plurality of sensors distributed locally in another agricultural installation for acquiring a plurality of further sensor signals, wherein the distributed sensor devices are configured for measuring process variables and/or state variables of the agricultural installation;

a cloud computing device configured to store the acquired sensor signals as cloud data; and a control device configured to control the agricultural installation, wherein the control device has an evaluation module for evaluating the first sensor signal, and wherein the evaluation comprises taking at least a portion of the stored cloud data into consideration to verify the first sensor signal in relation to the stored cloud data with the evaluation module, and wherein the control device:

generates one or more verified control signals to control at least one regulator of the agricultural installation, wherein:

the verified control signal is a control signal which is generated based on the combined evaluation of the first sensor signal and the cloud data, the verified control signal is generated when the preceding evaluation has confirmed that the first sensor signal is a verified sensor signal indicating that the sensor signal has been classified by the evaluation as being sufficiently correct or reliable, and the generating of the verified control signal comprises controlling at least one regulator selected from a group consisting of fans, lamps, pumps, motors, or door openers, to adjust an operating condition of the agricultural installation; and generates one or more verified suggestions for optimized operating parameters or operational settings of the agricultural installation, wherein:

the verified suggestion is a suggestion which is generated based on the combined evaluation of the first sensor signal and the cloud data, and the verified suggestion is generated when the preceding evaluation has concluded that the first sensor signal is not a verified sensor signal indicating that the first sensor signal has been classified by the evaluation as being not sufficiently accurate or not reliable.

27. The control system as claimed in claim 26, wherein:

the control device is configured to generate a verified control signal to control at least one regulator of the agricultural installation, wherein the verified control signal is a control signal which is generated based on the combined evaluation of the first sensor signal and the cloud data;

the control device is configured for generating a verified warning signal to indicate a warning and/or a perturbation of the agricultural installation, wherein the verified warning signal is a warning signal, which is generated based on the combined evaluation of the first sensor signal and the cloud data; and/or the control device is configured to generate a verified suggestion for optimised operating parameters of the agricultural installation, wherein the verified suggestion is a suggestion for optimised operating parameters which is generated based on the combined evaluation of the first sensor signal and the cloud data.

28. The control system as claimed in claim 26, wherein the control system further comprises:

at least the first sensor device;

the distributed sensor devices;

the cloud computing device;

a display for indicating verified warning signals;

a display for indicating verified suggestions for optimized operating parameters;

a concentration module for receiving the acquired sensor signals as raw data and for processing the raw data as cloud data; and/or a user interface for receiving user inputs which are taken into consideration in the control device.

* * * * *